(12) United States Patent
Albright et al.

(10) Patent No.: US 7,231,993 B2
(45) Date of Patent: Jun. 19, 2007

(54) DRIVE TRACK SUPPORT WITH VIBRATION ISOLATION

(75) Inventors: Larry E. Albright, Gwinner, ND (US); Dan Frederick, Forman, ND (US)

(73) Assignee: Clark Equipment Company, Montvale, NJ (US)

( * ) Notice: Subject to any disclaimer, the term of this patent is extended or adjusted under 35 U.S.C. 154(b) by 116 days.

(21) Appl. No.: 10/992,485

(22) Filed: Nov. 18, 2004

(65) Prior Publication Data

US 2005/0110346 A1 May 26, 2005

Related U.S. Application Data

(60) Provisional application No. 60/525,053, filed on Nov. 25, 2003.

(51) Int. Cl.
   *B62D 55/104* (2006.01)
(52) U.S. Cl. .................................. 180/9.5; 180/9.54
(58) Field of Classification Search ................. 180/9.5, 180/9.54, 9.44, 9.46, 9.52
   See application file for complete search history.

(56) References Cited

U.S. PATENT DOCUMENTS

| | | | |
|---|---|---|---|
| 1,474,918 A | 11/1923 | Schneider | |
| 2,059,212 A | 11/1936 | Dorst | 305/3 |
| 4,171,027 A | 10/1979 | Seit et al. | 180/9.54 |
| 4,232,754 A | 11/1980 | Corrigan et al. | 180/9.5 |
| 4,844,195 A | 7/1989 | Deli et al. | 180/9.5 |
| 5,076,378 A | 12/1991 | Lagace | 180/9.1 |
| 5,368,115 A | 11/1994 | Crabb | 180/9.1 |
| 5,697,463 A | 12/1997 | Schlegl | 180/9.5 |
| 5,785,395 A | 7/1998 | Crabb | 305/138 |
| 5,899,543 A | 5/1999 | Lykken et al. | 305/131 |
| 6,527,072 B1 * | 3/2003 | Schlegl et al. | 180/9.1 |

FOREIGN PATENT DOCUMENTS

GB     2 375 740     11/2002

OTHER PUBLICATIONS

The European International Search Report and Written Opinion for Application No. PCT/US04/038917, filed Nov. 18, 2004.

* cited by examiner

*Primary Examiner*—Jason R. Bellinger
(74) *Attorney, Agent, or Firm*—Michael Best & Friedrich LLP

(57) ABSTRACT

A track driven machine has a pair of track frames on opposite sides thereof, and each of the track frames has a pair of laterally extending arms fixed thereto. The arms are joined to a machine frame only through vibration isolating elastomeric blocks that carry compression loads from the arms to the machine frame. The elastomeric blocks are held in place with bolts that pass through openings in the machine frame. There are second elastomeric blocks above each of the first blocks to support downward movement of the arms relative to the machine frame.

17 Claims, 7 Drawing Sheets

DRIVE TRACK SUPPORT WITH VIBRATION ISOLATION

This application refers to and claims priority on U.S. Provisional Application Ser. No. 60/525,053, filed Nov. 25, 2003, the content of which is incorporated by reference.

BACKGROUND OF THE INVENTION

The present invention relates to drive track supports for track-laying machines. Specifically, the present invention deals with a resilient suspension system for isolating track vibration in a track-laying vehicle, such as a track drive skid steer loader.

A track driven machine has identical track frames on opposite sides of the machine frame. Each track frame mounts an endless track which is driven by a drive sprocket that is driven from a shaft of a drive motor. The track frames are supported relative to a machine frame. Contact with the ground during machine motion creates vibration in the track. Additional track vibration is created by the impact forces caused by the track tread and drive lugs. This track vibration is transmitted to the track frame and to the vehicle or machine frame and the operator's platform. Currently, there exist various track suspension systems to minimize vibrations; U.S. Pat. Nos. 1,474,918 and 5,899,543 are representative of the prior art.

U.S. Pat. No. 1,474,918 discloses a suspension system for a track-laying vehicle having an undercarriage rocking cross-beam with ends attached to each side of the track frame by means of spherical bearings. The cross-beam has two springs of limited flexibility mounted near the two ends for attaching the cross-beam to the machine frame. Additional suspension is provided by a similar spring mounted on top of the roller wheels assembly of each track.

U.S. Pat. No. 5,899,543 teaches a suspension system for a tracked vehicle having a roller wheel assembly comprising six roller wheels rotatably attached to a roller wheel beam having three wheels on each side of the beam. The beam has two ends with a T-shaped mounting bracket rigidly attached to each end, wherein the leg of the T-shaped bracket has a resilient component attached to each side of the leg. The T-shaped bracket is to be fitted into a corresponding female U-shaped mounting bracket that is rigidly attached to an undercarriage support beam that is ultimately attached to the machine frame. The U-shaped mounting bracket also has resilient component on each inner side of the "U" while having space in between to receive the T-shaped bracket. This design is an attempt to dampen vibration coming from the roller wheels by using resilient components as contact points.

The need still exists for a simple resilient track suspension system that will provide effective suspension and effective overall track vibration isolation.

SUMMARY OF THE INVENTION

The present invention relates to a resilient suspension system for a track-laying vehicle that includes a machine frame having support walls, and first and second track frames on opposite sides of the machine frame. Each track frame has a pair of support arms that extend laterally and are mounted to the vehicle frame using resilient coupling mechanisms (rubber isolators) for coupling the support arms to the machine frame.

Each of the plurality of resilient coupling mechanisms comprises a first resilient load-bearing element or isolator and a second load-bearing element to anchor the inner ends of the respective arms. A first set of the resilient load-bearing elements are in mid-portions of the arms and engages opposite surfaces of a machine frame support wall. The support arms of the track frame are coupled to load each of the first set of load-bearing elements in compression as the track and machine frames move in opposite direction relative to each other.

At the inner end of each support-arm, are second coupling mechanisms for supporting the support arms of the track frames relative to the machine frame at the center of the machine. The second coupling mechanism preferably are resilient, and preferably are rubber isolators, but pivot type supports can be used.

DETAILED DESCRIPTION OF THE PREFERRED EMBODIMENTS

Figure 1:
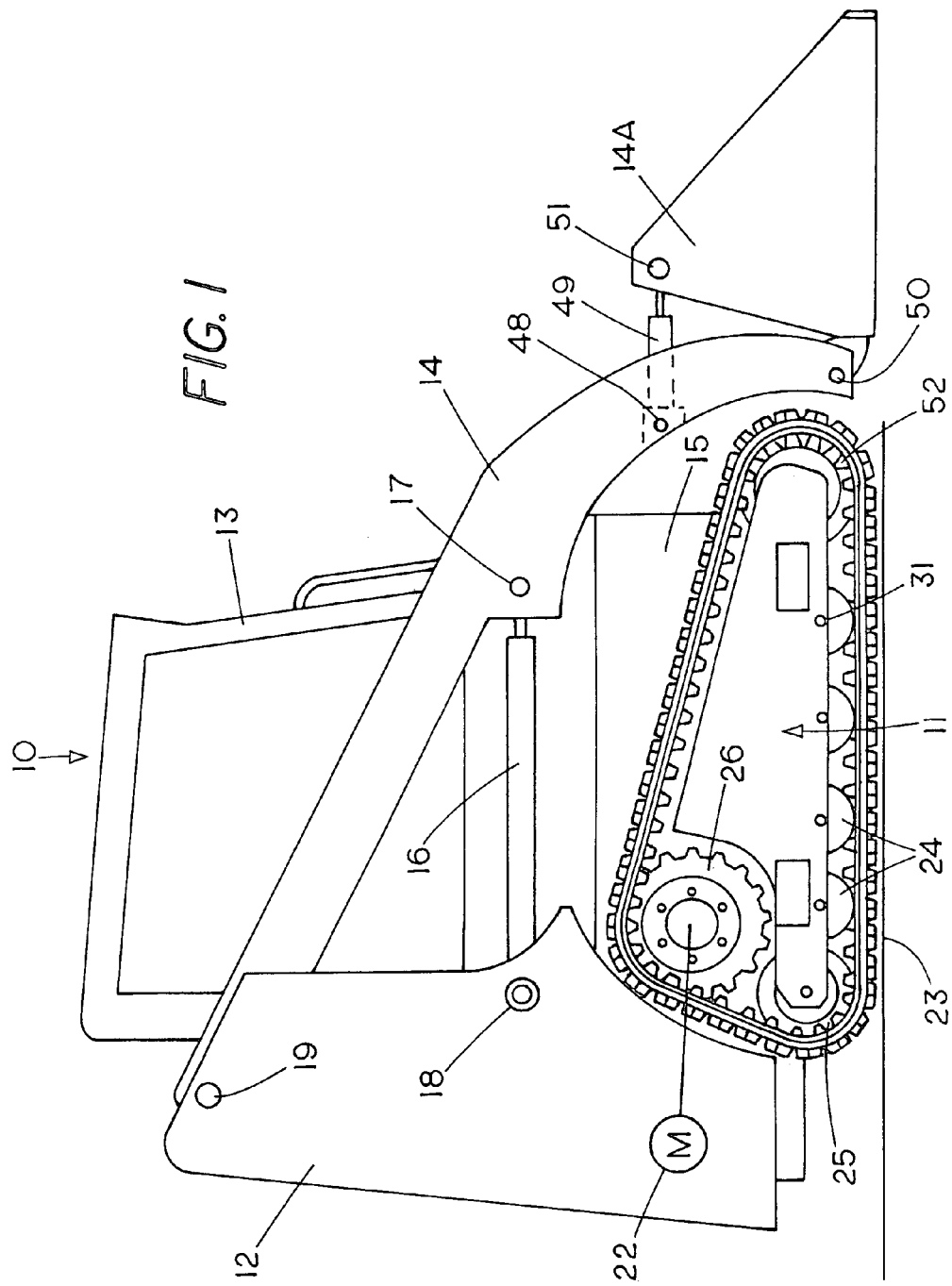
FIG. 1 is a schematic side view of a track-laying skid steer loader showing a typical track frame.

FIG. 1 is a side elevational view of a machine, as shown, a skid steer loader 10 having a track drive. Skid steer loader 10 includes a loader body 12 supported by a lower machine frame 15 that is in turn mounted onto a track frame assembly 11. The body 12 has an operator's cab 13 where the operator sits and controls the skid steer loader 10.

Lift arms 14 are pivotably mounted to loader body 12 at pivots 19 (only one of which is shown in FIG. 1, the other being identically disposed on the opposite side of the loader 10). The hydraulic cylinders 16 are pivotally mounted to the body 12 with pins 18 and to the lift arms 14 with pins 17. Lift arms 14 can be coupled to various working tools, such as a bucket 14A as shown in FIG. 1. Bucket 14A is coupled to the lift arms 14 at pivot points 50 and to hydraulic cylinder 49 at a pivot point 51. Hydraulic cylinder 49 is then pivotably coupled to a cross member between lift arms 14 at point 48. The operator controls the pivoting motion of bucket 14A by actuating the hydraulic cylinder 49.

The skid steer loader 10 is driven by a pair of endless tracks 23 (only one is shown in FIG. 1). Tracks 23 are in turn driven by separate drive sprockets 26 that are attached to the shafts of drive motors 22 (one on each side of the loader). Track 23 is kept tensioned by a tensioning wheel 52 and an idler wheel 25. Also encircled by track 23 are a plurality of supporting bogie wheels 24. Bogie wheels 24 support the track frame assembly 11 which supports the loader or machine frame 15. The bogie wheels 24 are mounted to the track frame assembly 11 with a plurality of mounting axles 31.

Figure 2:
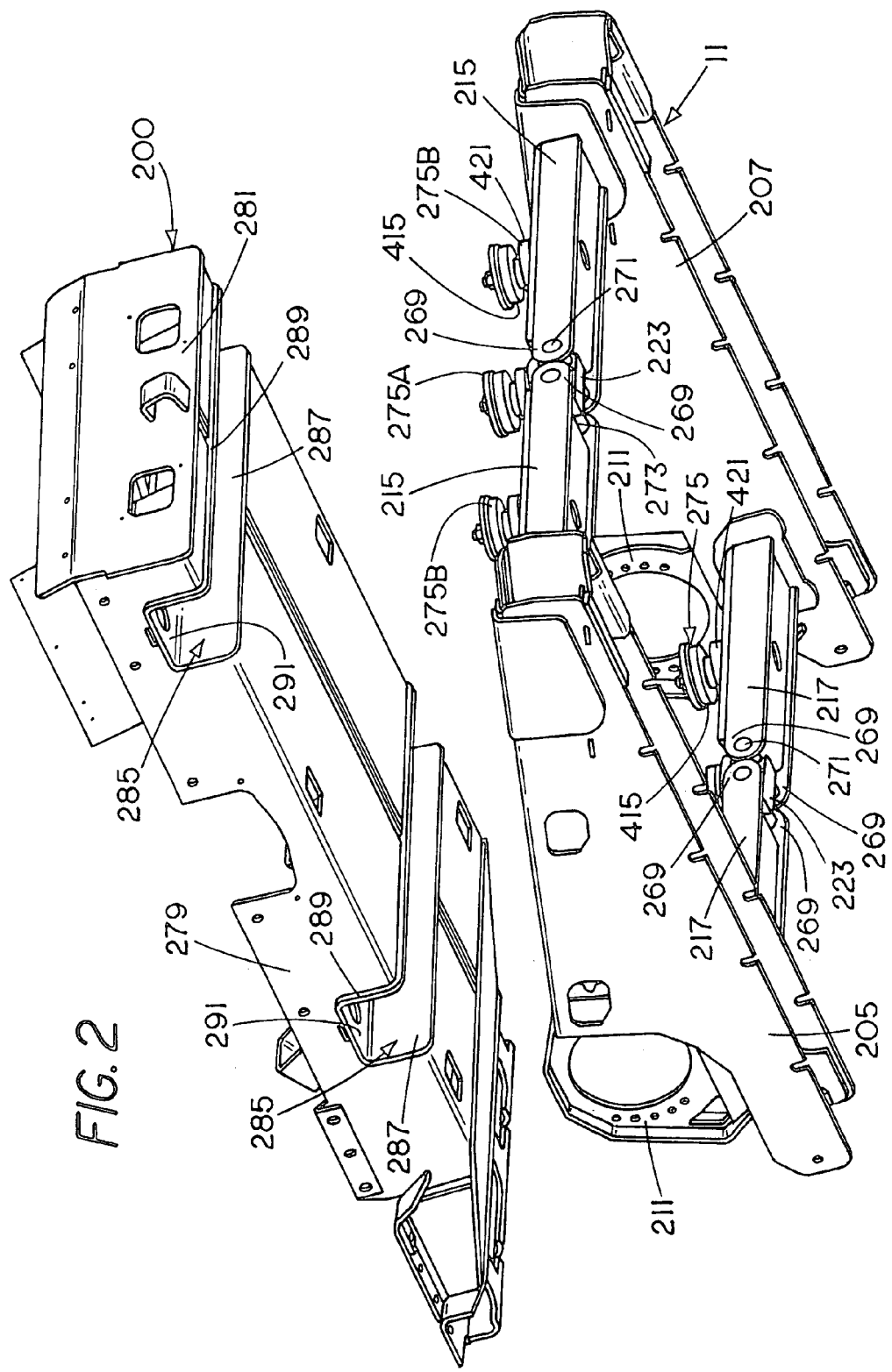
FIG. 2 is a bottom perspective exploded view of a lower portion of the loader and track frame assembly in accordance with one aspect of the present invention.

Referring to FIG. 2, track frame assembly 11 includes two identical track frames, a first track frame 205 and a second track frame 207, one on each side of the loader frame 15.

The upper-rear portion of each track frame has a drive motor support 211. The drive motors 22 are mounted to the respective supports 211 and when powered, the respective drive sprocket 26 drives the associated track 23. Each of the two track frames is supported on a first laterally extending front support arm 215 and a second laterally extending rear support arm 217. Each of the support arms 215 and 217 is attached at one end to the respective track frame and has a free or inner end 221. The free ends 221 are attached to a frame portion 200 of the bottom frame 15. As shown in the first form of the invention, the free ends of arm 215 and 217 of both track frames are pivotally attached to a mounting block 223. The block 223 is preferably, and as shown, supported to the frame portion 200 through a vibration absorbing connection. A directly supported or bolted connection for connecting the block 223 to the frame portion 200 can be used.

Figure 3:
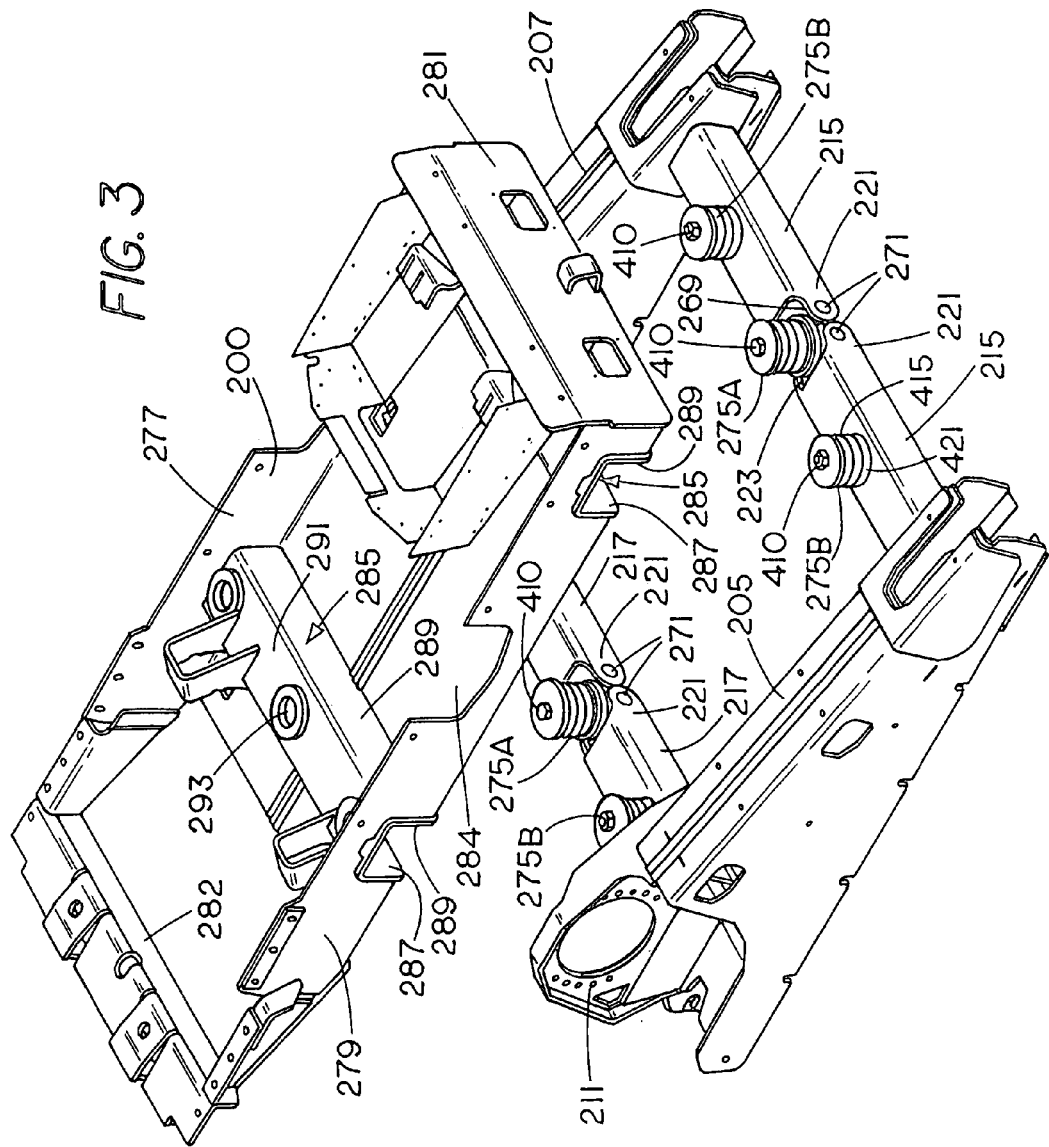
FIG. 3 is a top perspective exploded view of the loader frame and track frame assembly shown in FIG. 2.
Figure 4:
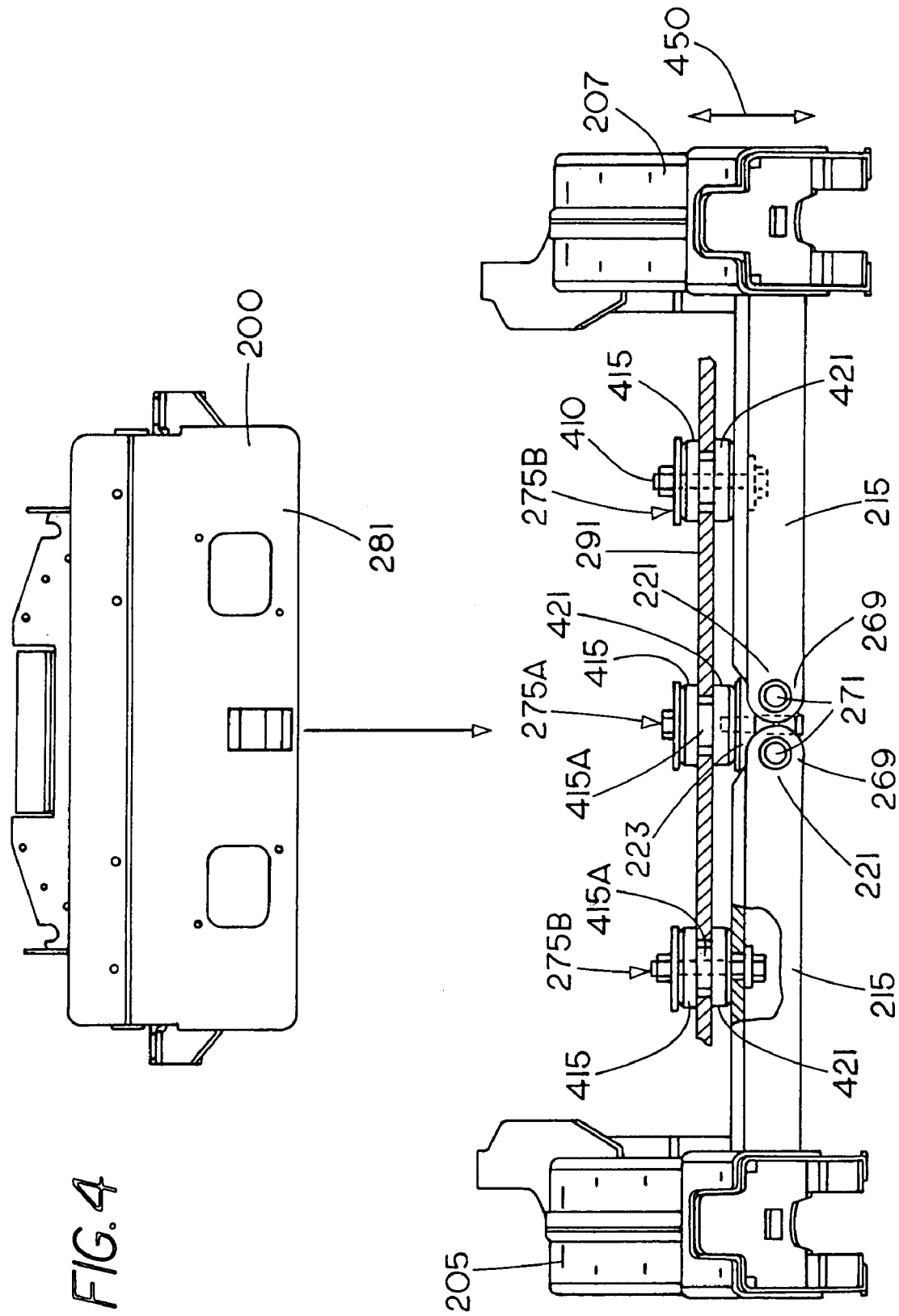
FIG. 4 is a front elevational view of the track frame assembly with the machine frame in section.

As can be seen in FIGS. 3 and 4, the support arms 215 and 217 are box section arms and have spaced flanges 269 at the free ends. The flanges 269 also have bores 271 for receiving horizontal pivot pins 273. Each mounting block 223 pivotally supports the two laterally aligning support arms 215 at the front and 217 at the rear of the track frames. The mounting blocks 223 are centered laterally on the frame portion 200 and the pivot pins 273 on each block are spaced apart so the two arms joined to the respective mounting block are independently pivoted.

In an alternative embodiment, the mounting block 223 has only one pivot pin, and the flanges 269 are arranged to overlap such that both arms 215 and the two arms 217 are pivoted on the same pivot pin.

When assembled, each support arm 215 and 217 can pivot to permit limited vertical movement of the track frames supported by the pivot pins 273. In the preferred form, the mounting block 223 has an upper surface supporting a resilient elastomeric isolation support block assembly 275A.

Alternatively, the mounting block 223 may be made larger to accommodate two resilient support assemblies 275A instead of one. Thus, a resilient support block assembly including elastomeric isolators for mounting blocks 223 couples the machine frame portion 200 and the support arms 215 and 217 of the track frames 205 and 207 together. The pivot joints allow the outer ends of support arms 215 and 217, and thus the respective track frames to vibrate vertically and rotate about the pins 273. The resilient block assemblies mounting the arms to the frame absorb and dampen the vibrational energy emanating from the tracks 23. This translates to lower transmission of vibration from the track 23 to the machine frame portion 200 and also to the cab 13. When block 223 is secured directly to the frame, the vibration is absorbed or dampened with outboard resistant support assemblies 275B as will be shown.

FIG. 3 also shows the frame portion 200 side walls 277 and 279 that are connected by a front wall 281 and a rear wall 282. The frame portion 200 also has a base plate or base wall 284. Base wall 284 has two integrally formed, downwardly opening channels or support arm mounting pockets 285 that have top walls 291 spaced upwardly from the base wall 284 and extending transversely the full width of frame portion 200. Each channel or pocket 285 is formed with two side walls 287 and 289 joining the top wall 291, which is the support for the mounting blocks 223 and for the other resilient mounting or coupling mechanism 275. In the preferred embodiment, the support wall 291 has mounting holes 293 for receiving the three resilient support assemblies 275A and 275B for each of the support arms 215 and 217. One of the mounting holes 293 is centrally located for supporting the preferred resilient support assembly 275A for mounting block 223. The other two mounting holes for the resilient support assembly 275B for the respective arms 215 and 217 are each located close to the side walls 277 and 279. Each arm 215 and 217 is also supported in the channels or pockets 285 at the outer mounting holes with elastomeric blocks of resilient support assemblies.

Each of the resilient support assemblies 275A and 275B is constructed identically and includes a first resilient elastomeric load-bearing block or puck 415 above the respective supporting wall 291 and second resilient elastomeric load-bearing block or puck 421 below the wall 291. One of the pucks of each set, as shown, the upper puck 415 has an integrally molded resilient collar 415A that fits through the associated hole 293 to rest in the lower elastomeric puck 421. Each elastomeric puck has a centrally located hole for receiving a bolt 410. The bolt 410 passes through the center holes in the elastomeric blocks or pucks to hold them in place. Washers are used under both the head and nut on each bolt 410.

The two resilient elastomeric isolator blocks or pucks 415 and 421 sandwich the upper support wall 291 of the pockets or channels 285 of the machine frame portion 200. The resilient support assemblies insulate the machine frame portion 200 and the entire machine frame 15 from the vibrations and shocks generated by the track 23 in the direction shown in FIG. 4 by arrows 450 by resiliently absorbing the vibrational energy coming from the track 23. As the respective track frame 205 or 207 moves vertically in relation to the vehicle frame portion 200, the resilient elastomeric isolator blocks or pucks are loaded in compression to dampen the vibration. The coupling arrangement for the center resilient support assembly 275A and the mounting block 223 is the same, with both of the resilient blocks or pucks sandwiching the top wall 291 of pockets or channels 285.

Each of the resilient load-bearing pucks 415 and 421 can carry static load in vertical direction. The elastomeric blocks or pucks 415 and 421 are made of vibration absorbing or dampening materials, such as rubber or neoprene.

As can be seen in FIG. 4, the central support assembly 275A is positioned above the upper surface of the mounting block 223 and when installed, puck 421 rests on the lower surface of the top wall 291 of the pocket or channel 285 in the lower wall 284 of the loader frame 200. The elastomeric block 415 is placed on top of wall 291 and a bolt 410 is used to retain the elastomeric blocks in position and secure mounting block 223 in place.

Figure 5:
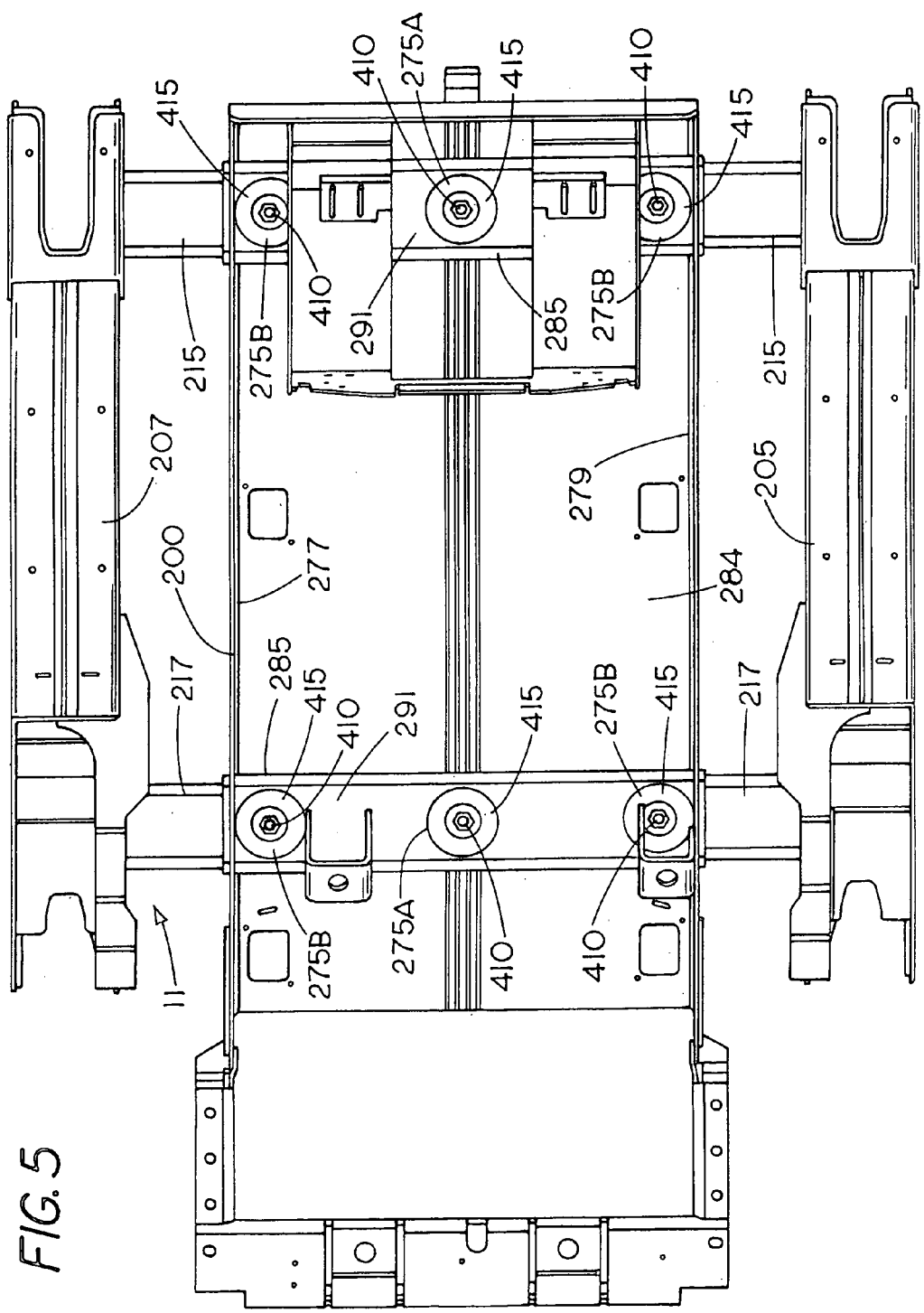
FIG. 5 is a top view of the loader frame and track frame assembly.

FIG. 5 shows the top view of the track frame assembly 11 and the machine frame portion 200. It also shows the locations of the six resilient support assemblies 275A and 275B that mount the track frame assembly 11 and the machine frame portion 200 together.

Figure 6:
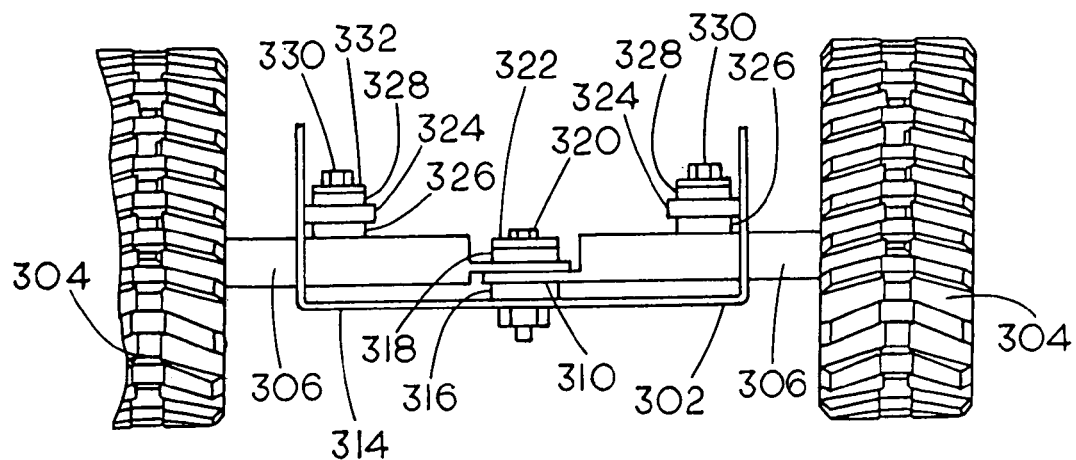
FIG. 6 is a front elevational view of a first alternative embodiment of the track frame with a sectional view of the loader frame.
Figure 7:
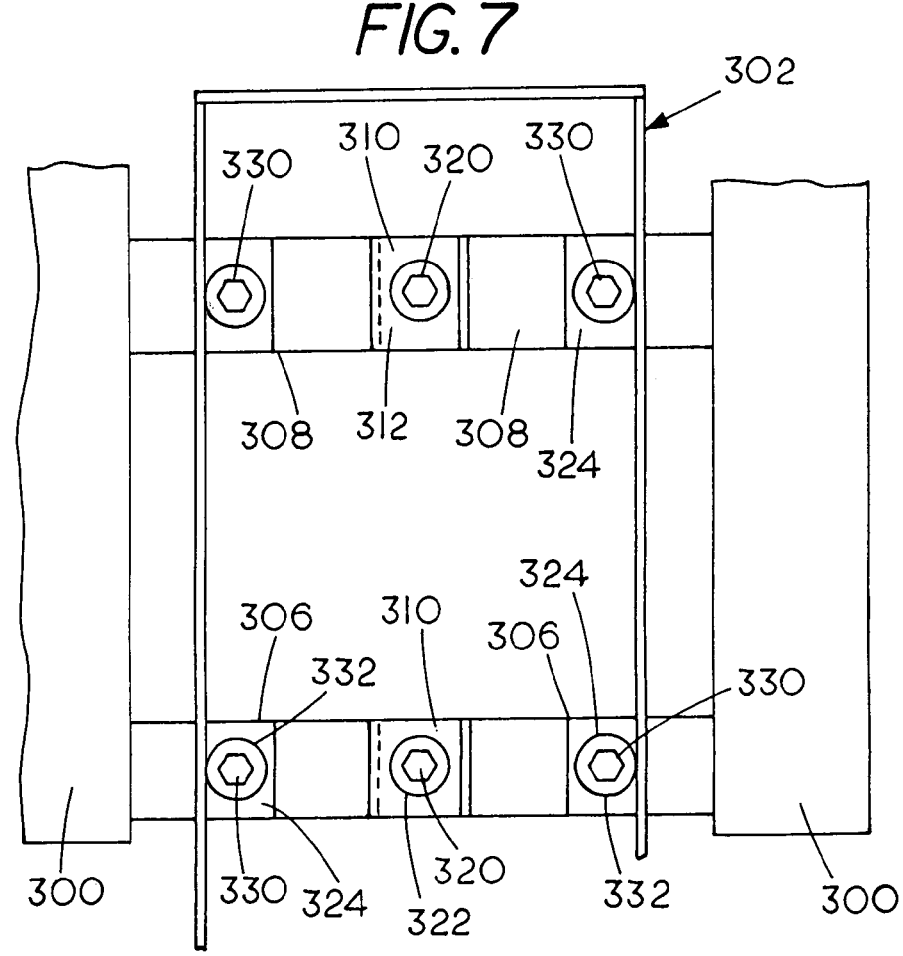
FIG. 7 is a top view of the assembled loader frame and track frame assembly of the alternative embodiment of FIG. 6.

Referring to the modified form of FIGS. 6 and 7, the track frames are represented at 300, on opposite sides of a machine frame 302. The track frames that are represented as blocks in FIG. 7 have tracks 304 on the opposite sides that are driven in a suitable manner. The track frames each have an arm 306 at one end of the frame, and an arm 308 at the other end of the frame. These arms 306 and 308 are fixed to the track frames in a suitable manner, so that they are cantilevered out from the track frames and extend to overlie portions of the machine or loader frame 302. In this form of the invention, the inner ends of the arms 306 each have an end horizontal flange 310, and the arms 308 each have a flange 312, which are formed the same as the flanges 310.

In order to mount the arms 306 and 308 in pairs relative to the machine frame 302, and achieve vibration isolation, the flanges 310 and 312 are supported on a bottom wall 314 of the frame through a resilient elastomeric block or puck 316 that rests on the upper surface of the bottom wall 314, and the upper surface of the puck 316 in turn supports the two flanges 310, which are placed one above the other.

A second resilient elastomeric puck 318 is placed on top of the flanges 310, and the flanges 310 are then held to the bottom or support wall 314 through the use of a bolt 320 that has a washer 322 under the head, and which extends through openings in the puck, and in the flanges 310, as well as through a hole in the bottom wall 314, to be secured in place with a nut at the bottom end of the bolt 320. In this form resilient elastomeric pucks or blocks sandwich the flanges so there is a resilient support block or puck to dampen vibration in both vertical directions.

In addition, to support the vertical loads, the frame 302 has support flange brackets 324 on opposite side walls of the frame. These brackets 324 are rigidly secured to the frame, and the intermediate or center portions of each of the arms 306 are supported from upward movement relative to the respective flange bracket 324 through vibration isolation elastomeric pucks shown at 326. These vibration isolation elastomeric pucks rest on the top wall of the arms 306 and then underneath the flange brackets 324. Top elastomeric pucks 328 are provided above the flange brackets 324. The assembly of the two pucks 326 and 328 is held in place with a bolt 330 that passes through a washer 332, and openings in each of the pucks 326 and 328 through the bracket 324, and through an opening in the top wall of the respective arms 306, to be secured on the interior of these arms with a suitable nut.

Again, in this instance, the vertical loads are reacted through resistant elastomeric blocks or pucks that will transfer and dampen vertical loads from the arms 306 and 308, which are mounted in the same manner as arms 306, in both upward and downward vertical directions. The elastomeric pucks dampen the vibrations from the track frames.

If desired, the horizontal loads can be reacted with elastomeric material as well, by putting in reaction walls on the arms relative to the side walls of the loader supporting the arms and track frames.

In this instance, the inner ends of the arms are not pivoted on pins, but are mounted for some pivotal movement by compressing the pucks 326 or 328, and distorting the pucks 316 and 318. Thus, there is a limited amount of pivoting of the arms 306 and 308 from the center of the vehicle frame or loader frame to the track frames.

The simplified vibration isolation arrangement will absorb and isolate vibrational loads from the vehicle frame, and thus from an operator's cab on the vehicle frame.

Figure 8:
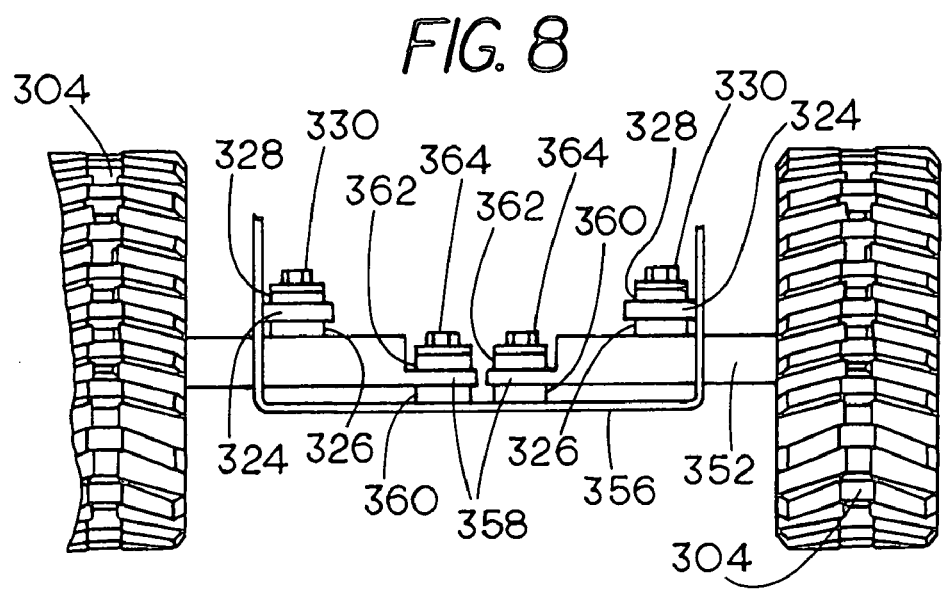
FIG. 8 is a front elevational view of a second alternative embodiment of the track frame with the loader frame in section.
Figure 9:
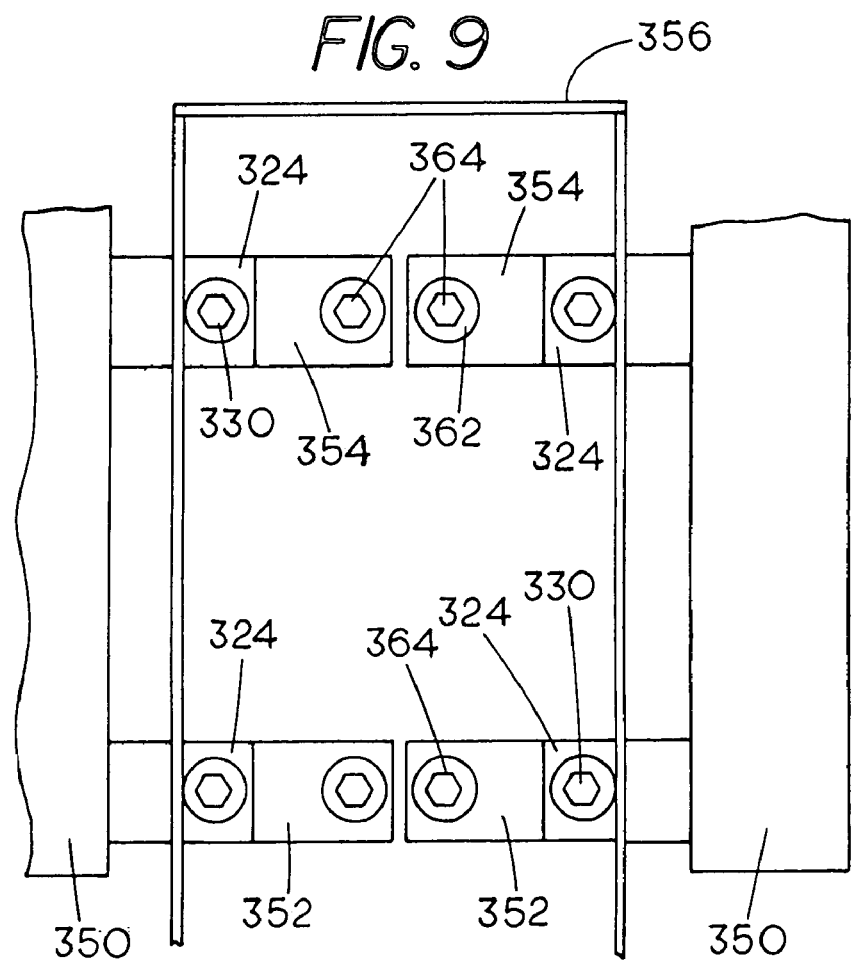
FIG. 9 is a top view of the assembled machine and track frame assembly shown in FIG. 8.

In FIGS. 8 and 9, a further modified form is shown, and in this instance, the track frames 350 are provided with laterally extending arms 352 and 354. As previously explained, the arms are secured to the frames rigidly. The arms 352 and 354 extend inwardly to a vehicle or loader frame 356 and the only difference between the forms shown in FIGS. 8 and 9, and the forms shown in FIGS. 6 and 7, is that the arms terminate short of each other in the center of the loader frame. The arms from the track frames that align have flanges 358 that are spaced apart in the center, so that each of the flanges 358 is secured with a separate resilient support assembly. In this form, each of the flanges 358 is supported on an elastomeric resilient block or puck 360 that rests on the upper surface of a lower wall of the loader or vehicle frame 356. An elastomeric resilient block or puck 362 is also positioned above each of the flanges 358. The flanges and the pucks are held in place on the frame with a bolt 364 that passes through openings in the pucks, and through openings in the bottom wall of the frame 356 to hold the pucks in place and provide for limited movement as the pucks are compressed. The supports for the arms 352 and 354 at the edges of the frame 356 are the same as that explained in FIGS. 6 and 7, and are numbered the same, since the flange brackets attach to the frame side walls in the same manner. Here, too, the arms will be moved under vibration or loading, and compress the elastomeric blocks or pucks to absorb vibration, and also support loads. The bolts 364 permit vertical movement of the outer ends of the arms while the elastomeric blocks or pucks are distorted, both in the center portion where they are held by the bolts 364, and at the brackets 324.

The use of the cylindrical elastomeric blocks or puck to support arms extending from the track frames on a loader frame provides a simplified, easily made support arrangement for the tracks. The elastomeric blocks or pucks can be selected as to stiffness or durometer to support the desired load.

Although the present invention has been described with reference to preferred embodiments, workers skilled in the art will recognize that changes may be made in form and detail without departing from the spirit and scope of the invention.

What is claimed is:

1. A vibration isolation mounting for a ground support for a mobile vehicle having a vehicle frame with lateral side edges, the ground support having a ground support frame, a laterally extending arm having one end mounted on the ground support frame and having a second end, and the arm extending laterally inwardly from a side edge and being positioned to be supported by portions of the vehicle frame, and at least one resilient compression-carrying isolator block positioned laterally inwardly of the side edge and mounted between the arm and a portion of the vehicle frame to transmit compression loads through the resilient compression carrying isolator block to the vehicle frame.

2. The vibration isolation mounting of claim 1, wherein said isolator block comprises an elastomeric block having a mounting opening for securing the block in place relative to the arm and the vehicle frame.

3. The vibration isolation mounting of claim 1, wherein the mounting between the arm and the vehicle frame comprises a pivotal mounting at the second end of the arm and the resilient compression-carrying isolator block being positioned between portions of the vehicle frame and the second end of the arm to permit the ground support frame to move generally vertically.

4. The vibration isolation mounting of claim 3, wherein said resilient compression-carrying isolator block at the second end of the arm flexes as the second end of the arm tends to move from vertical loads on the ground support frame.

5. The vibration isolation mounting of claim 2, wherein said ground support frame comprises a track carrying frame for a tracked vehicle.

6. The vibration isolation mounting of claim 2, wherein the ground support frame comprises a first ground support frame on a first side of the vehicle frame, and a second ground support frame on an opposite second side of the vehicle frame from the first ground support frame, the second ground support frame having a second arm extending laterally inwardly from a second side of the vehicle frame, and a second resilient compression-carrying isolator block positioned inwardly from the second side between the second arm and a portion of the vehicle frame to carry compression loads on the second arm to the vehicle frame.

7. The vibration isolation mounting of claim 6, wherein said isolator blocks are elastomeric material.

8. A vibration isolation system for mounting a pair of track frames to a machine frame comprising a machine frame having generally downwardly facing horizontal surface portions, each of the track frames having at least one laterally extending arm fixed thereto, the laterally extending arms having free ends that extend laterally inward from the respective sides of the machine frame toward a center of the machine frame, a mount for mounting the inner ends of the arms for limited pivotal movement to permit the track frames to move vertically relative to the machine frame, and a separate elastomeric isolator block positioned between a surface of each of the arms and a downwardly facing horizontal surface of the machine frame to carry compression loads between the arms and the machine frames, the pivotal mounting and the compression-carrying elastomeric isolator blocks being the sole support for carrying vertical load motions of the track frames relative to the machine frame.

9. The vibration isolation system of claim 8, wherein the elastomeric blocks are supported on slidable fasteners passing through openings in the machine frame, and each of the elastomeric blocks having second elastomeric blocks on an upper side of a wall of the machine frame having the downwardly facing horizontal surface, and fastener bolts extending through the elastomeric blocks and the wall of the machine frame to load the second elastomeric blocks in compression when the arms move away from the downwardly facing, horizontal surface in a vertical direction.

10. A vibration isolation system for mounting ground supports to a machine frame, comprising:
a machine frame;
a track frame assembly having first and second track frames, each of the track frames having a first support arm and a second support arm; and
a plurality of resilient support block assemblies for coupling the machine frame to the support arms of each track frame for limited movement, each of the plurality of resilient support block assemblies having a first resilient load-bearing block and a second resilient load-bearing block, the first and second resilient load-bearing blocks engaging opposite surfaces of a machine frame wall, the support arms of the track frame being coupled to load both the first and second load-bearing blocks in compression as the track frames and machine frame move in opposite directions relative to each other.

11. The isolation system of claim 10, wherein there is a separate coupling mounting each of the first and second support arms of the first and second track frames to the machine frame adjacent a center line between the first and second track frames.

12. The vibration isolation system of claim 11, wherein the separate coupling comprises:
first and second pivot blocks supported on the machine frame adjacent a longitudinal center line thereof, the first and second support arms of the respective first and second track frames each having free ends, the first arms of the first and second track frames being pivotally mounted to the first pivot block and the second arms of the first and second track frames being mounted to the second pivot block.

13. A skid steer loader having a suspension system, the suspension system comprising:
a machine frame;
a track frame assembly comprising first and second track frames, each of the track frames having a first front support arm and a second rear support arm;
a plurality of resilient support block assemblies for coupling the machine frame to the support arms of each track frame for limited vertical movement, each of the plurality of resilient support block assemblies being in a mid-portion of the support arms, respectively, and having a first resilient load-bearing block and a second resilient load-bearing block, the first and second resilient load-bearing blocks engaging opposite surfaces of a machine frame wall, the support arms of the track frames being coupled to load the resilient load-bearing blocks in compression as the track frames are loaded relative to the machine frame; and
a separate coupling attaching each of the first and second support arms of the first and second track frames to the machine frame adjacent a center of the machine frame.

14. The skid steer loader having the suspension system of claim 13, wherein the resilient load-bearing blocks are made of vibration absorbing isolator material that carries static compression load in all directions.

15. The skid steer loader having the suspension system of claim 13, wherein the machine frame is coupled to the track frame at a plurality of locations on the support arms, the coupling locations on each support arm being substantial at a center portion between first and second ends of the respective support arms, and at ends of the arms opposite from the track frames.

16. The vibration isolation mounting of claim 1, including a mount for mounting the second end of the arm for limited pivotal movement to permit the ground support to move vertically relative to the vehicle frame, and wherein the isolator block is positioned and mounted to carry vertical loads from the arm to a downwardly facing horizontal surface of the machine frame.

17. The vibration isolation mounting of claim 16, wherein the pivotal mounting and the isolator block are the sole support for carrying loads from vertical motion of the ground support relative to the vehicle frame.

* * * * *